Dec. 9, 1952 N. D. ABBEY 2,621,106
TUBE MILL
Filed April 3, 1947 2 SHEETS—SHEET 1
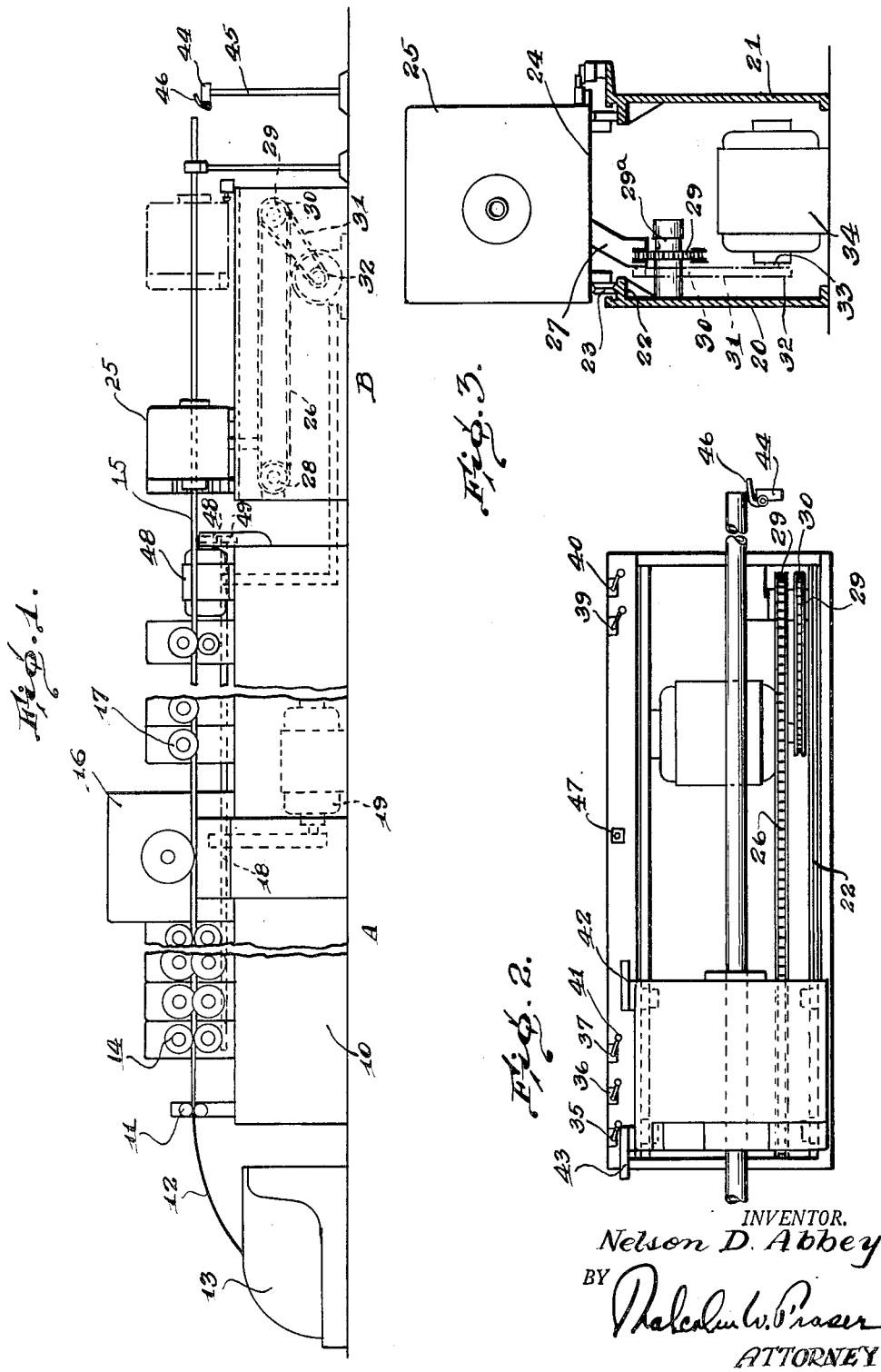
INVENTOR.
Nelson D. Abbey
BY
Malcolm W. Fraser
ATTORNEY Dec. 9, 1952 N. D. ABBEY 2,621,106
TUBE MILL
Filed April 3, 1947 2 SHEETS—SHEET 2

INVENTOR.
Nelson D. Abbey
BY
ATTORNEY

UNITED STATES PATENT OFFICE 2,621,106

TUBE MILL

Nelson D. Abbey, Toledo, Ohio, assignor to The Etna Machine Company, Toledo, Ohio, a corporation of Ohio Application April 3, 1947, Serial No. 739,136

6 Claims. (Cl. 23—33)

This invention relates to apparatus for severing measured lengths of shaped material and particularly for severing measured lengths of tubing while moving continuously from the tube forming means.

In the severing of hollow metal bodies, such as metal tubing, it is desirable that the cutting tools slowly and uniformly engage the metal body at a point to be severed and effect the severing operation over a space of time. Otherwise such metal distortion or damage might result as will make the cut lengths unsuitable for the purpose for which they are intended. For this reason, cutting elements such as flying shears, which are often employed for severing continuous lengths of material while moving, are unsuitable, but instead it is desirable to provide a cutting tool adapted positively to clamp the material and effect the severing operation relatively slowly while moving with material being cut.

An object of this invention is to produce a new and improved cut-off mechanism by which the sectioning of lengths of shaped metal parts may be effected without damage or distortion of the metal walls or impairment of the cutting tools.

Another object of this invention is to produce an improved cut-off mechanism which is simple in construction, and positive in operation, on work being fed continuously for the severance thereof into measured uniform lengths.

A further object is to produce a work cut-off apparatus synchronized with the work forming process for severing the work into uniform measured lengths without interference of the work forming process.

A still further object is to produce a tube cut-off mechanism for severing measured lengths of tubing in cooperation with but without stopping or retarding the progress of the continuous tube forming process.

A still further object is to produce a simple tube cut-off mechanism mounted automatically to travel through a cycle of operations including the translatory shifting movement of the mechanism in synchronized relation with the tubing during the tube cutting operations and return to its starting position, the mechanism automatically decelerating near the end of its travel in either direction for purposes of reducing the possibilities of injury to the various parts.

A still further object is to produce a tube cut-off mechanism with a cutting tool mounted on a reciprocal carriage regulated for advancing movement in synchronized relation with the advancing tubing, the cutting tool being operated by separate power means automatically actuated during the advancing movement of the carriage for effecting the tube severing operation while the tube and carriage are traveling together, and means are provided to insure disengagement of the cutting tool from the tubing before the deceleration of the carriage near the end of its travel in either direction.

These and other objects and advantages of this invention will hereinafter appear, and for purposes of illustration but not of limitation, an embodiment of this invention is shown in the accompanying drawings, in which Figure 1 is a diagrammatic illustration of a unit operation for forming and cutting measured lengths of tubing from an endless strip of metal;

Figure 2 is a top plan view of the mechanism cooperating with the tube forming mechanism for cutting the tubing into measured lengths;

Figure 3 is an end elevational view of the mechanism shown in Figure 2; and

Figure 4:
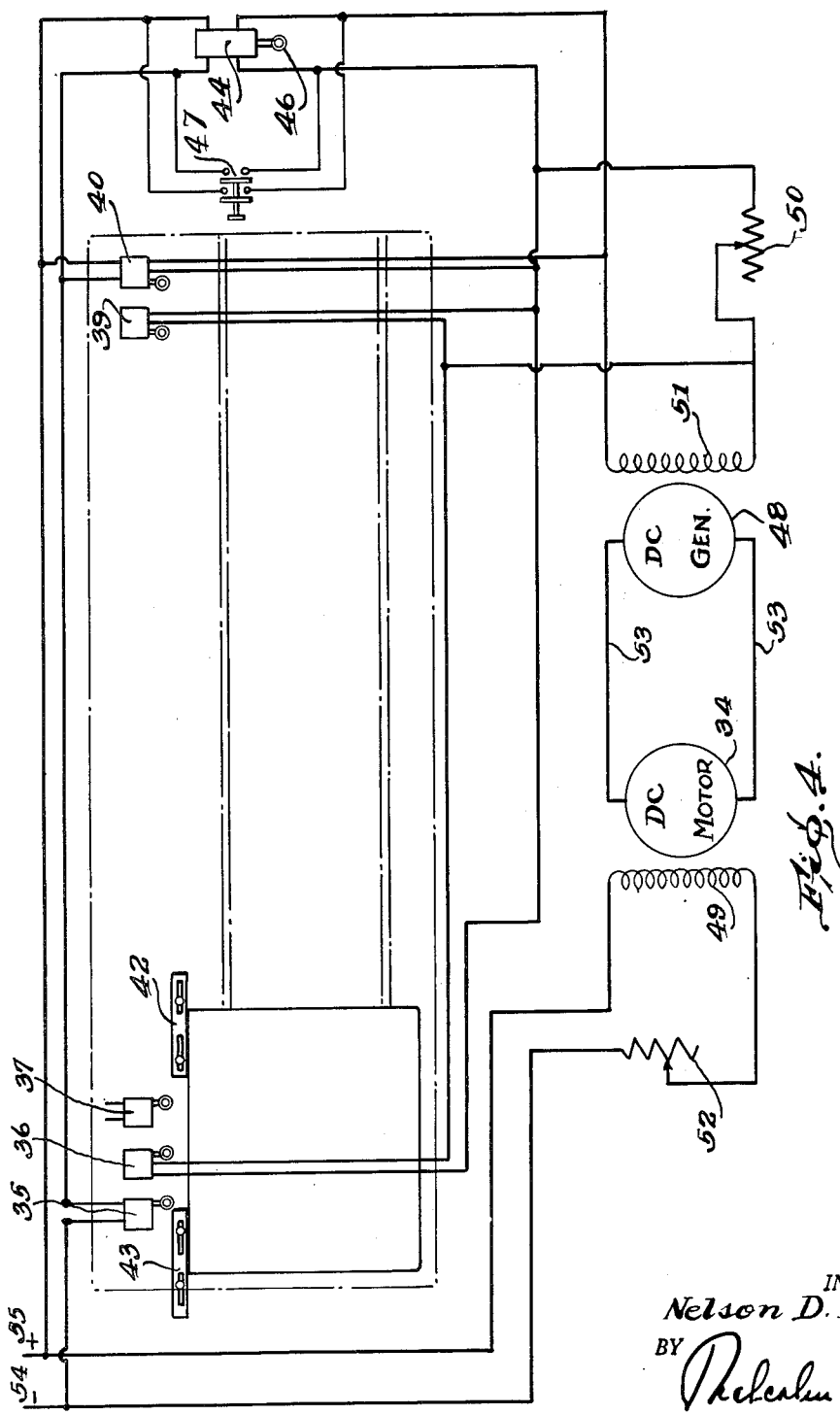
Figure 4 is an electrical diagram adapted to effect the desired operations.

The present embodiment of the invention herein shown for purpose of illustration is capable of cutting predetermined lengths of shaped metal bodies, which in view of their cross sectional contour and the kind and thickness of the material of which they are formed, might be distorted or damaged by the use of a synchronized but instantaneous cutting device such, for example, as a flying shear. In this application of the invention, the preferred embodiment is shown as applied to the cutting of metal tubing continuously being formed, the seams of which have been welded, but the invention is not to be limited to tubing, pipe or other hollow bodies formed of metal but might equally include lengths of shaped material formed of paper, wood, or plastics and the like, with or without welded or adhered seams.

The cutting operation preferably is effected by material displacement as in the manner produced by operating saw blades, and as the cutting operation is not instantaneous, but instead, takes place over a space of time, it is a desideratum to synchronize the movement of the cutting device with that of the advancing tube during the cutting operations. For this purpose, the separately actuated cutting tools are positioned on a carriage mounted for reciprocal translatory shifting movement axially of the moving tubing. Means are provided for synchronizing the movement of the carriage with that of the tubing during the greater portion of its advancing movement and for decelerating the carriage near the end of its travel in either direction to reduce the wear and tear and readjustment that would follow more sudden stops.

Many forms of shears are known which are capable of effecting severing operations of the type described. However, I preferably mount a cutting tool of the type described in my co-pending application for Letters Patent entitled "Tube Clamping and Severing Mechanism," filed August 4, 1945, and bearing the Serial Number 608,885, and now Patent No. 2,484,601, granted October 11, 1949. Although detailed description thereof for the present is considered unnecessary, suffice it to say that the device on actuation operates through a series of successive movements including gripping the tubing by a pair of clamping jaws to prevent relative movement between the tubing and the severing means; inward and then outward radial movement of the revolving cutting tools, which are separately powered to effect the desired cutting operation; and then the release of the tubing by the clamping jaws to enable relative movement between the cutting device and the tubing as is desired in bringing the carriage to a stop and effecting its return movement in preparation of another cycle of operations.

Thus, if the tube cutting mechanism is rendered operative at a predetermined point relative to the travel of the carriage and if the carriage is in turn actuated with respect to the production of a measured length of tubing, it is manifest that successively measured lengths of tubing will be severed by the mill. Means, hereinafter described, may be provided automatically to initiate the desired operations whereby the tubing continuously produced will be severed into sections of predetermined lengths without constant surveillance or adjustment, and without interfering with the tube forming operations.

In Figure 1 of the drawings, there is illustrated a tube forming and severing device consisting of a tube forming section A and a tube severing section B. The tube forming section includes a platform 10, which supports at one end feeding rolls 11 for drawing the metal strip 12 from a rotatably mounted spool 13. Following the feeding rolls 11, there is provided a series of tube forming rolls 14 by means of which the relatively flat strip of metal is turned and shaped into the form of tubing 15. The seams of the tubing are continuously welded together, as by an electric welder 16. Welders capable of effecting the desired continuous operation are well known to those skilled in the art, and since it forms no part of this invention, detailed description thereof is deemed unnecessary. From the welder, the tubing passes through sizing rolls 17 and from there into the cutting section B. The forming and sizing rolls 14 and 17 respectively are driven from a main drive shaft 18 by means of a drive, such, for example, as by a variable speed motor 19.

Positioned forwardly of the tube forming section A is the tube severing section B which consists of laterally spaced upright frame members 20 and 21. A longitudinally disposed elongate rail 22 extends inwardly from the upper portion of each frame member 20 and 21, and operatively engaging the rails are wheels 23 which support a carriage 24 in a manner to enable longitudinal movement of the carriage relative to the frame members. Mounted on the carriage is the cutting device 25 previously described. The longitudinal movement of the carriage is effected by means of a belt in the form of an endless chain 26 which operatively engages an arm portion 27 depending integrally from the underside of the carriage 24. The chain 26 engages sheaves or sprockets 28 and 29 at opposite ends of the frame. The stub shaft 29a supports the sprocket 29 and also operatively mounts another sprocket 30 connected to a drive sprocket 32 through a chain 31. The sprocket 32 is fixed onto the end portion of a shaft 33 of a reversible motor 34. Thus by means of the motor 34 the chain 26 may be actuated in one longitudinal direction or the other to effect concomitant movement of the carriage 24 and the cut-off mechanism 25 which it mounts.

Arranged on the upper surface and to one side of the frame member 21 are a series of operating switches 35, 36, 37, 39 and 40. These are each provided with switch arms 41, which, when engaged by one or the other of the cam arms 42 and 43 mounted on the adjacent side of the carriage 24, initiate the operations hereinafter to be described. The switches 35, 36, 37 mounted in consecutive order from rearward end portion of the cut-off mechanism comprise the return stop switch, the reverse slow down switch, and the cut-off operating switch respectively. The other series of switches 39 and 40 mounted in consecutive order on the forward end of the frame comprises the forward slow down switch and the reverse operating switch respectively.

As illustrated in Figures 1 and 2 of the drawings, another switch 44, the automatic tube limit switch, is mounted on a separate movable standard 45 which may be positioned a predetermined distance apart from a cut-off mechanism. The switch arm 46 of the switch 45 is maintained in axial alignment with the oncoming tube by which it is adapted to be tripped.

In operation, the carriage 24, which at the start is in a position shown by the solid lines in Figure 1, is actuated in the forward direction when the motor 34 is energized on engagement of the forward end of the tube 15 with the switch arm 46 of the tube limit switch 44. Immediately the carriage is accelerated in the forward direction towards synchronization with the speed of the forwardly moving tubing 15. After the carriage reaches the desired speed, the cam arm 43 is positioned to trip the switch arm of the cut-off operating switch 37, whereby the operation of the cut-off mechanism is initiated.

These operations as previously described, comprise first, the gripping of the tube by the clamping jaws, the subsequent inward radial movement of the constantly driven cutting tools until the tube wall is completely severed, at which time the cut-off tools automatically are returned to their original position, and then the release of the tube by the clamping jaws. The described series of cutting and clamping operations is adapted to be completed before the carriage has traversed the entire length of the frame. Thus, such relative movement between the carriage and the tubing may take place as will enable the deceleration of the carriage to a full stop and the return of the carriage to its original position of adjustment without damage to the tube cut-off mechanism, damage to the tubing, or interference with the tube forming means.

As the carriage continues its advancing movements, and after the clamping jaws have released the axially disposed tubing, the cam arm 42 trips the lever arm of the forward slow down switch 39. Thereupon, the forward advancing movement of the carriage 24 is greatly decelerated, so that when the cam arm 42 engages the lever arm of the reverse operating switch 40, the carriage comes to a standstill and reverses its direction of movement without harmful or other unsuitable movements which otherwise might result from the sudden stoppage of an advancing heavy body, such as the carriage. When the switch 40 is tripped, the direction of operation of the motor 34 is reversed, and the carriage 24 is actuated for translatory movement toward its original position of adjustment. As the carriage approaches its original starting position, the rear end portion of the cam arm 43 is adapted first to engage the lever arm of the reverse slow down switch 36, whereby the rate of travel of the carriage is greatly decelerated. This enables smooth and unharmful stoppage of the carriage on engagement of the cam arm 43 with the reverse stop switch 35.

The above describes a complete cycle of the mechanical operation of the tube cut-off mechanism as it cooperates with the continuously operating tube forming device in severing measured lengths of tubing. It is manifest that the initiation of the cycle operations may be effected manually by means of a hand operated switch 47 or on engagement of the forward end portion of the tube with the tube limit switch 44. Thus the tube may be severed at any position desired by manual actuation or automatically by mechanical actuation, if the tube limit switch 44 is in a position to be tripped when the desired length of tubing has passed between the cutting tools.

In order to provide for coincident movement between the traveling cut-off mechanism and the moving tubing during the cutting operations, means are provided for synchronizing the linear movement of the traveling carriage with that of the advancing tube, which may, for example, be varied to produce tubing at the rate of about 40 to 120 linear feet of tubing per minute.

As previously pointed out, the cut-off mechanism is accelerated from a standstill to the speed of the moving tube within the space of time allowed by the movement of the forward end portion of the cam arm 43 through the distance to engage the cut-off operating switch 37. Thereafter, the tubing is clamped and the cut-off mechanism travels with the tubing during the severing operations. When the tubing is severed, the cutting tools are returned to their original position and the tubing is released by the clamping jaws; these operations being effected by means forming a part of the tube severing device 25. Subsequently the carriage is decelerated and returned to its original position as described.

Referring now to the electrical diagram, the drive for the cut-off mechanism includes a D. C. generator 48, which in Figure 1 of the drawings, is shown as being mounted on the forward end portion of the platform 10 and in operative connection with the main drive shaft 18 by which it is driven, and a shunt wound D. C. motor 34. The field 49 of the motor 34 is separately excited. The source of excitation of the motor and generator generally consists of an electronic rectifier, but may as well be any D. C. source of voltage, which, in the diagram, is shown as coming from terminals 54 and 55.

The terminals 54 and 55 are connected through the poles of the forward tube limit switch 44 and reverse operating switch 40 and through a slow down rheostat 50 to the generator field 51. The action of the forward tube limit switch and the reverse operating switch is to reverse the polarity of the D. C. voltage to the generator field 51 thereby to reverse the polarity of the generator terminal voltage which feeds to the motor 34. In this manner, the motor is controlled for effecting the actuation of the carriage 24 in one direction or the other in response to the operation of one or the other of the tube limit switch or the reverse operating switch. The forward slow down switch 39 and the reverse slow down switch 36 work in connection with the slow down rheostat 50 effectively to reduce the D. C. excitation of the generator field to a lower value, whereby the generator terminal voltage is reduced. When this occurs, the countervoltage of the motor is then greater than that of the generator voltage and the motor feeds power back to the generator, resulting in a heavy reverse current in the loop circuit 53 between the motor and generator. This functions as a braking means on the motor which causes it almost instantaneously to decelerate. Adjustment of the rate of deceleration of the motor may be effected manually through adjustment of the slow down rheostat 50.

In actual operation, when the speed of the tube forming mill is changed, the speed of rotation of the D. C. generator is correspondingly changed since it is driven directly from the main drive shaft 18 of the mill. In view of the fact that the voltage output of the generator is proportional to its peripheral speed, the cut-off drive motor 34 changes speed proportionally whereby the travel of the carriage and its mounted cut-off mechanism is synchronized with the linear travel with the tube throughout the greater portion of its advancing movement in the direction of the tube.

When it is desired to produce larger or smaller sizes of tubing at relatively the same speed through the mill, it is expedient merely to change the speed of operation of the mill drive proportionally to the change of the root diameter of the rolls. In order to compensate for the slight changes of the speed of the drive without, at the same time, changing the rate of linear speed of the tubing, it is desirable to place a rheostat 52 in the motor field circuit to provide for a limited speed variation of the motor. The rheostat is adapted to be manually adjusted when the mill is set up to produce a particular size of tubing.

For purpose of the description, an automatic cycle of operation incorporating both the mechanical as well as the electrical operations will now be made. At the outset, the carriage 24 stationarily rests on the frame in its rearward position of adjustment. The tubing 15, after it is formed, passes coaxially relative to the cut-off mechanism until the free end contacts the lever arm 46 of the tube limit switch 44. On actuation of the tube limit switch, D. C. voltage is directed from the terminals 54 and 55 to the D. C. motor 34 and to the D. C. generator 47 which in turn feeds voltage to the D. C. motor. The carriage is accelerated from a complete standstill to that of the speed of the traveling tube. Since the voltage output of the D. C. generator is proportional to its speed of operations, and the speed of operation of the D. C. motor is directly influenced by the voltage received from the generator, it is manifest that the advancing movement of the carriage 24 is synchronized with that of the main drive so that it travels at the same linear rate as that of the formed tubing.

During the advancing movement of the carriage, the forward end portion of the cam arm 43 engages the cut-off mechanism starting switch 37. Thereafter, while the cut-off mechanism and the tubing are advancing together, the tubing is clamped, severed, and then released as previously described. Since the cut-off mechanism is separately driven, the described series of severing operations are effected at a uniform rate independent of the rate of travel of the carriage. The severed tubing is removed and as the carriage continues its forward advancement coincident with the tubing, the cam arm 42 engages the forward slow down switch 39. The generator field is then reduced by the rheostat 50 to a low value thereby to decelerate the carriage as previously described. On actuation of the reverse switch 40, the polarity of the D. C. voltage fed to the generator is reversed thereby to reverse the polarity of the voltage from the generator to the motor. This causes the carriage to come to a standstill and reverse its direction of travel for return movement toward its starting position at a relatively high rate of speed. The rate of travel of the carriage is relatively low at the time the cam arm 42 engages the reverse operating switch whereby strains on the parts which are suddenly reversed and through them other parts of the apparatus, are minimized. Near the end of its return movement, the cam arm 43 engages the reverse slow down switch 36 and the slow down rheostat 50 is again effectively inserted into the circuit to reduce the speed of the D. C. motor and the rate of travel of the carriage in the reverse direction. When the cam arm 43 engages the reverse stop switch 35, the generator and motor are deenergized and the carriage is brought to a standstill until again actuated on engagement of the tube limit switch 44 by the oncoming tube or by means of the manually operable starting switch 47.

From the above description, it is manifest that I have produced a new and improved means for effecting cutting operations on a continuously moving tubing without interfering with the tube forming or feeding operations, without damage or distortion of the side walls of the severed unit, and without damage or excessive wear on the cutting tools. Since cutting operations are performed preferably by a tool of the saw cutting type, which operates slowly and uniformly to cut through the side wall of the tube or other shaped parts, means also are provided for synchronizing the movement of the tubing and the severing mechanism during the cutting operation. The cut-off mechanism is designed to cooperate with the tube forming mechanism and together they constitute a tube mill capable of forming and subdividing tubing or other shaped bodies into predetermined uniform lengths, which in view of the type of cut-off and the necessity of shifting the cut-off mechanism in the direction of the advancing tube and return, are of lengths greater than three feet and preferably range between lengths of six and thirty feet. These lengths may repeatedly be obtained irrespective of the rate of travel or the rate of formation of the tubing. The above does not operate as limitation on the application of the cut-off mechanism described for it is understood that where relatively thin-walled tubing is or other readily severable substances or items are formed, shorter and even larger lengths may be secured.

It is manifest that I have produced a new and improved cut-off mechanism adapted to operate on continuously advancing material or work for the purpose of subdividing the work into predetermined lengths. The mechanism consists of relatively few operating parts which are arranged in the manner to be readily available for adjustment, replacement, or repair as may be desired. Means are provided in the machine for automatically regulating the rate of travel of the cut-off mechanism and the timed relation of the successive operation of the entire tube forming and cut-off mechanism. Manual means are provided for the regulation of the lengths of work which are successively automatically to be cut and for adjusting other operations, such, for example, as the rate of travel of the cut-off mechanism, actuation of the cutting cycle, and the relative cycle of operation of each of the functions which comprise the cycle.

It is to be understood that other changes in details of construction, assembly and operation of the parts may be effected without departing from the spirit of this invention especially as defined in the following claims.

What I claim is:

1. In a tube mill, adjustable powered means for continuously producing and advancing the tubing, a generator operatively connected to said powered means, a carriage movable axially of the tube between two positions of adjustment, a separately driven tube cut-off mechanism mounted on the carriage, a separately excited reversible electric motor connected to actuate the carriage for translatory movement in either direction, an operative connection between said motor and generator whereby the speed of travel of the carriage is automatically synchronized with the linear speed of the tubing, and switch means for successively and automatically energizing said electrical motor thereby to effect synchronized advancing movement of the carriage, initiating the operation of said tube cut-off mechanism which grips the tube during the greater portion of their movement together and severs the tubing, decelerating the carriage near the end portion of its advancing movement following the release of the tubing by the cut-off mechanism, reversing the direction of travel of the carriage, decelerating the carriage near the end of its return movement and stopping the carriage at its original position of adjustment.

2. In a tube mill, a series of tube-forming rolls for producing a tube and advancing the same lengthwise along a path towards a tube severing mechanism, tube severing mechanism including tube severing means and a carriage for said severing means mounted for shifting movements between two positions of adjustment axially of the tubing, a reversible drive mechanism including a reversible motor connected to actuate the carriage alternately in each of two opposed directions between said positions, a generator for said motor, and a drive for said generator coupled with said tube-forming rolls, thereby to enable the movement of the carriage to be synchronized with the advance of the tube.

3. In a tube mill, a series of tube-forming rolls for producing a tube and advancing the same lengthwise along a path towards a tube severing mechanism, tube severing mechanism including tube severing means and a carriage for said severing means mounted for shifting movements between two positions of adjustment axially of the tubing, a reversible drive mechanism including a reversible motor connected to actuate the carriage alternately in each of two opposed directions between said positions, a generator for said motor, a drive for said generator coupled with said tube-forming rolls, thereby to enable the movement of the carriage to be synchronized with the advance of the tube, and means forming a part of said drive constituted to effect deceleration of the carriage near the end of its travel in each direction.

4. A tube mill as claimed in claim 3, in which the carriage decelerating means comprises a rheostat for reducing the excitation of the generator field so that the countervoltage of the reversible motor exceeds that of the terminal voltage of the generator.

5. In a tube mill, a series of rotatable tube-forming rolls for producing a tube and advancing the same lengthwise towards a tube cut-off mechanism, a tube cut-off mechanism, a carriage for said cut-off mechanism translatorily shiftable between two limits, tube advancing means, an independently excited reversible electric motor connected to impart translatory movement to said carriage alternately in each of two opposed directions, a generator for said motor, and means rotating with the tube-forming rolls for driving said generator so that the speed of travel of the carriage is synchronized with the linear speed of the advancing tubing.

6. In a tube mill, a plurality of rotatable tube-forming rolls defining a tube pass, a main operating variable speed electric motor drivingly connected to at least one of said rolls, a flying cut-off mechanism mounted adjacent the end of said tube pass for to and fro translatory movement in reverse directions for severing tubing into predetermined lengths, a direct current motor connected to impart to and fro movement in said reverse directions to said cut-off mechanism, a direct current generator having an output directly coupled to said direct current motor for energizing the same, and a driving connection between said generator and said variable speed motor.

NELSON D. ABBEY.

REFERENCES CITED

The following references are of record in the file of this patent:

UNITED STATES PATENTS

| Number | Name | Date |
|---|---|---|
| Re. 15,843 | Stirk et al. | May 20, 1924 |
| 865,813 | Powell | Sept. 10, 1907 |
| 1,991,083 | Dean | Feb. 12, 1935 |
| 2,168,853 | Abbey | Aug. 8, 1939 |
| 2,186,061 | Berg et al. | Jan. 9, 1940 |
| 2,209,995 | Morris | Aug. 6, 1940 |
| 2,211,362 | Bennett | Aug. 13, 1940 |
| 2,265,129 | Darner | Dec. 9, 1941 |
| 2,267,543 | Watson | Dec. 23, 1941 |
| 2,326,463 | Johnston | Aug. 10, 1943 |
| 2,366,243 | Edwards | Jan. 2, 1945 |
| 2,428,567 | Harris et al. | Oct. 7, 1947 |
| 2,432,876 | Formhals et al. | Dec. 16, 1947 |
| 2,547,157 | Gibbons | Apr. 3, 1951 |